(12) United States Patent
Messmer et al.

(10) Patent No.: US 9,115,745 B2
(45) Date of Patent: Aug. 25, 2015

(54) SECURING NUT

(75) Inventors: Guenther Messmer, Duerbheim (DE); Alexander Steigerwald, Thalmaessing (DE); Peter Unseld, Markdorf (DE)

(73) Assignees: Metallwarenfabrik Hermann Winker GmbH & Co. KG, Spaichingen (DE); AUDI AG, Ingolstadt (DE)

( * ) Notice: Subject to any disclaimer, the term of this patent is extended or adjusted under 35 U.S.C. 154(b) by 322 days.

(21) Appl. No.: 12/652,135

(22) Filed: Jan. 5, 2010

(65) Prior Publication Data

US 2010/0260576 A1 Oct. 14, 2010

(30) Foreign Application Priority Data

Jan. 9, 2009 (DE) .......................... 10 2009 004 638

(51) Int. Cl.
*F16B 39/284* (2006.01)
*F16B 39/36* (2006.01)
*F16B 39/02* (2006.01)

(52) U.S. Cl.
CPC ............. *F16B 39/026* (2013.01); *F16B 39/284* (2013.01); *F16B 39/36* (2013.01)

(58) Field of Classification Search
USPC .......................................... 411/277, 280–283
See application file for complete search history.

(56) References Cited

U.S. PATENT DOCUMENTS

| 930,450 | A | * | 8/1909 | Zinow | 411/277 |
|---|---|---|---|---|---|
| 2,255,286 | A | * | 9/1941 | Harvey | 411/282 |
| 2,286,981 | A | * | 6/1942 | Todd | 411/282 |
| 2,454,444 | A | * | 11/1948 | Poupitch | 411/277 |
| 2,923,339 | A | * | 2/1960 | Skidmore | 411/277 |
| 3,145,751 | A | * | 8/1964 | Boots | 411/282 |
| 3,354,926 | A | * | 11/1967 | Mattick | 411/282 |
| 4,291,737 | A | * | 9/1981 | McMurray et al. | 411/282 |
| 4,381,163 | A | * | 4/1983 | Witte et al. | 411/311 |
| 5,033,924 | A | * | 7/1991 | Cosenza | 411/282 |
| 5,148,727 | A | * | 9/1992 | Williamson | 81/121.1 |
| 5,827,027 | A | * | 10/1998 | Wakabayashi | 411/283 |
| 7,011,481 | B2 | * | 3/2006 | Winker | 411/277 |

FOREIGN PATENT DOCUMENTS

| DE | 4307091 A1 | 10/1993 |
|---|---|---|
| DE | 19724714 A1 | 12/1998 |
| DE | 10052915 A1 | 6/2002 |

* cited by examiner

*Primary Examiner* — Flemming Saether
(74) *Attorney, Agent, or Firm* — Reinhart Boerner Van Deuren P.C.

(57) ABSTRACT

In order to improve a securing nut comprising a base member which is provided around its circumference with a key face contour, a threaded bolt receptacle which is provided with an internal thread and passes through the base member in the direction of a central axis as well as at least one clamping element which is provided on the base member, in such a manner that it is, on the one hand, simple to produce and, on the other hand, allows reliable clamping without damaging the threaded bolt it is suggested that the clamping element be a collar which is arranged on one side of the base member and in which the internal thread is continued, and that the collar extend around the threaded bolt receptacle in an essentially closed manner in circumferential direction with respect to the central axis.

20 Claims, 7 Drawing Sheets

— Original position
---- Initial clamping position
-·-·- Clamping position

FIG.7

SECURING NUT

CROSS-REFERENCE TO RELATED PATENT APPLICATIONS

The present disclosure relates to the subject matter disclosed in German application number 10 2009 004 638.0 of Jan. 9, 2009, which is incorporated herein by reference in its entirety and for all purposes.

BACKGROUND OF THE INVENTION

The invention relates to a securing nut comprising a base member which is provided around its circumference with a key face contour, a threaded bolt receptacle which passes through the base member in the direction of a central axis and is provided with an internal thread as well as at least one clamping element arranged on the base member.

Securing nuts of this type are known, wherein in their case the clamping element is formed from individual separate projections which can lead to the formation of chippings at the threaded bolt when the securing nuts are screwed on.

The object underlying the invention is, therefore, to improve a securing nut of the generic type in such a manner that it is, on the one hand, simple to produce and, on the other hand, allows reliable clamping without damaging the threaded bolt.

SUMMARY OF THE INVENTION

This object is accomplished in accordance with the invention, in a securing nut of the type described at the outset, in that the clamping element is a collar which is arranged on one side of the base member and in which the internal thread is continued, and that the collar extends around the threaded bolt receptacle in an essentially closed manner in circumferential direction with respect to the central axis.

The advantage of the solution according to the invention is, therefore, to be seen in the fact that as a result of the essentially closed course of the collar around the threaded bolt receptacle the collar has, on the one hand, a greater stability than the individual projections known from the state of the art and that, in addition, it is possible to prevent ends of the projections resulting in damage to the threaded bolt, in particular, in the formation of chippings at the threaded bolt.

In principle, it would be possible for the collar to be provided with openings.

It is, however, particularly advantageous when the collar extends around the threaded bolt receptacle in a completely closed manner.

The advantage of this solution is to be seen in the fact that it is particularly stable and has no tendency whatsoever to form chippings.

With respect to the design of the collar, no further details have so far been given.

One advantageous solution, for example, provides for the collar to comprise at least two collar sections which are arranged at a distance from one another in circumferential direction and for an internal threaded section of each collar section on the clamping element to extend in the clamping area, in an initial clamping position, in a necked in manner in the direction of the central axis deviating from a course of an internal threaded section on the base member.

This means that, in the clamping area, the internal threaded section on the collar deviates from a regular course of the internal threaded section on the base member, namely due to the fact that it is necked in in the direction of the central axis in order to achieve the clamping action when a threaded bolt is screwed in.

In this respect, it is particularly favorable when the internal threaded sections on the clamping element are increasingly necked in in the clamping areas with increasing extension of the clamping areas away from the base member.

In the simplest case, it is provided for the internal threaded sections on the collar to extend in the clamping areas in a necked in and conically tapering manner relative to the central axis in the direction away from the base member.

Such a solution may be produced particularly easily.

In addition, one advantageous solution provides for the collar sections, in the initial clamping position, to have end areas which are located on both sides of the clamping areas and in which the internal threaded section on the clamping element extends in a radial direction relative to the central axis at least at a radial distance which corresponds to the radial distance of the course of the internal threaded section on the base member relative to the central axis.

This solution has the advantage that, as a result, the end areas of the collar sections do not contribute to the clamping action but rather the clamping action is generated merely in the clamping areas and so no damage to the threaded bolt can occur, in particular in the end areas of the collar sections, in particular with formation of chippings.

One particularly favorable solution provides for the internal threaded sections on the clamping element to extend in the end areas in a radial direction relative to the central axis at a radial distance which is greater than the radial distance of the course of the internal threaded section on the base member relative to the central axis.

In principle, a course of the internal threaded section on the clamping element as described above could be produced by way of corresponding machining of the internal thread in the area of the collar sections, in particular in the clamping areas or end areas thereof.

The course of the internal threaded section on the clamping element in accordance with the invention can, however, be produced in a particularly simple manner when it is achieved by way of plastic deformation of the collar sections which are produced in an original position in that the internal threaded section on the clamping element corresponds exactly to the internal threaded section on the base member with respect to their radial distances from the central axis and, subsequently, the course of the internal threaded section on the clamping element which deviates from this is achieved by way of plastic deformation of the collar sections in the clamping areas and, consequently, in the end areas.

In the simplest case, the clamping areas are subject to a deforming action radially inwards in the direction of the central axis in order to achieve the plastic deformation, whereby a plastic deformation of the end areas radially outwards away from the central axis results automatically on account of the essentially closed, circumferential course of the collar.

In principle, the collar and the collar sections could be designed cylindrically or in any other optional shape relative to the central axis.

One particularly favorable solution provides, however, for the collar to have at least two collar sections which have, in their clamping areas, a greater wall thickness in a radial direction relative to the central axis than in end areas of the collar sections which are located on both sides of the clamping areas.

This solution has the great advantage that a greater wall thickness is available in the clamping areas in order to apply the forces required for the generation of the clamping force while the lesser rigidity desired is present in the end areas as a result of the slighter wall thickness.

In principle, the wall thickness could vary between the clamping areas and the end areas in an irregular manner.

A solution is, however, particularly favorable, with which the collar sections have a continuously decreasing wall thickness in the direction of the end areas proceeding from the clamping areas.

A further, advantageous solution provides for the collar to have at least two collar sections which have, in their clamping areas, a greater wall thickness in a radial direction relative to the central axis than in side areas adjoining the clamping areas.

In this respect, it is expediently provided for the collar sections to have a continuously decreasing wall thickness in the direction of the side areas proceeding from the clamping areas.

Furthermore, it is preferably provided for the wall thickness to be less in the end areas adjoining the side areas than in the side areas.

One particularly preferred solution provides for the wall thickness of the collar sections to be at a maximum in the clamping areas.

Furthermore, it is expediently provided for the wall thickness of the collar sections to be at a minimum in the end areas.

One particularly expedient solution provides for the wall thickness in the end areas to be less than half the maximum wall thickness in the clamping areas so that, on the one hand, an adequately high rigidity is present in the clamping areas and, on the other hand, the necessary low rigidity in the end areas in order to avoid any damage to the threaded bolt, in particular the formation of chippings, by the end areas.

In order to obtain, in particular, a collar which extends around the threaded bolt receptacle in a closed manner, it is preferably provided for the end areas of successive collar sections to adjoin one another in circumferential direction so that the collar sections of this solution are all connected to one another and, therefore, supported relative to one another.

It is provided, in particular, for the end areas to adjoin one another in an area with a minimum wall thickness.

In the simplest case, the collar sections merge into one another in one piece in their end areas.

In order to achieve the clamping action according to the invention in an advantageous manner, it is preferably provided for the collar sections to be movable into a clamping position proceeding from their initial clamping position as a result of an essentially elastic deformation radially to the central axis.

This solution is of advantage since an essentially elastic deformation of the collar sections during the transition from the initial clamping position into the clamping position takes place and so the clamping force exerted by the collar sections in the clamping position is then permanently effective and, in addition, can be reproduced in the initial clamping position in the case of a defined geometry.

It is provided, in particular, for the collar sections, in the clamping position, to act on a threaded bolt, which is screwed into the threaded bolt receptacle, with their clamping areas with an elastic force caused by the elastic deformation and, therefore, achieve the desired clamping action in the clamping areas with the internal thread on the clamping element which abuts on an external thread of the threaded bolt in a manner acted upon by force.

Furthermore, it is advantageous in this case for the collar sections, in the clamping position, to extend with their end areas with clearance relative to the threaded bolt screwed in in order to avoid any damage to the threaded bolt, in particular any formation of chippings, by the end areas when the threaded bolt is screwed in.

With respect to the design of the collar, no further details have so far been given.

In principle, the collar could be designed as a separate part which is connected to the base member.

With respect to manufacturing technology, it is, however, particularly advantageous when the collar is integrally formed on the base member in one piece; in this respect, it is advantageous, in particular, when the collar is integrally formed on the base member in one piece by way of mass forming.

An additional, advantageous solution provides for the base member to be provided with a pressure flange and for the collar to be arranged on the base member on a side located opposite the pressure flange.

In the embodiments described above, the mention is of at least two collar sections. In accordance with the invention, several collar sections can, therefore, also be provided, for example, three and more collar sections with a clamping area each.

Preferably, the collar sections with the clamping areas are arranged such that the clamping areas are arranged with respect to the central axis in the manner of a plural symmetry, i.e., a two-fold or three-fold symmetry or a multiple thereof in order to achieve a clamping action on the threaded bolt which is symmetrical to the central axis.

Additional features and advantages are the subject matter of the following description as well as the drawings illustrating one embodiment.

DETAILED DESCRIPTION OF THE INVENTION

Figure 1:
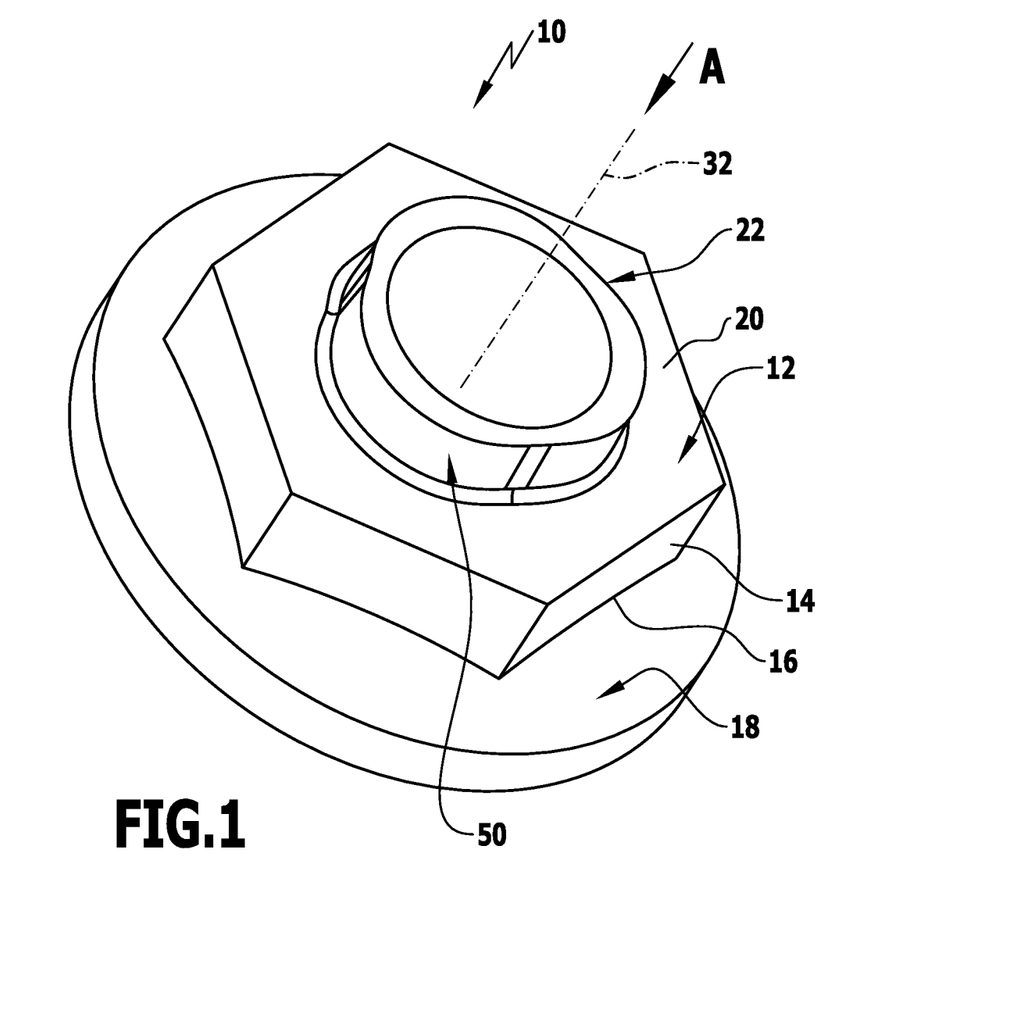
FIG. 1 shows a perspective illustration of one embodiment of a securing nut according to the invention.

One embodiment of a securing nut 10 according to the invention, illustrated in FIG. 1, comprises a base member 12 which is provided around its circumference with a key face contour 14.

The base member 12 has on a first side 16 a pressure flange 18 and on a second side 20 a clamping element which is designated as a whole as 22 and is integrally formed on the base member 20 in one piece, in particular by way of mass forming.

Figure 2:
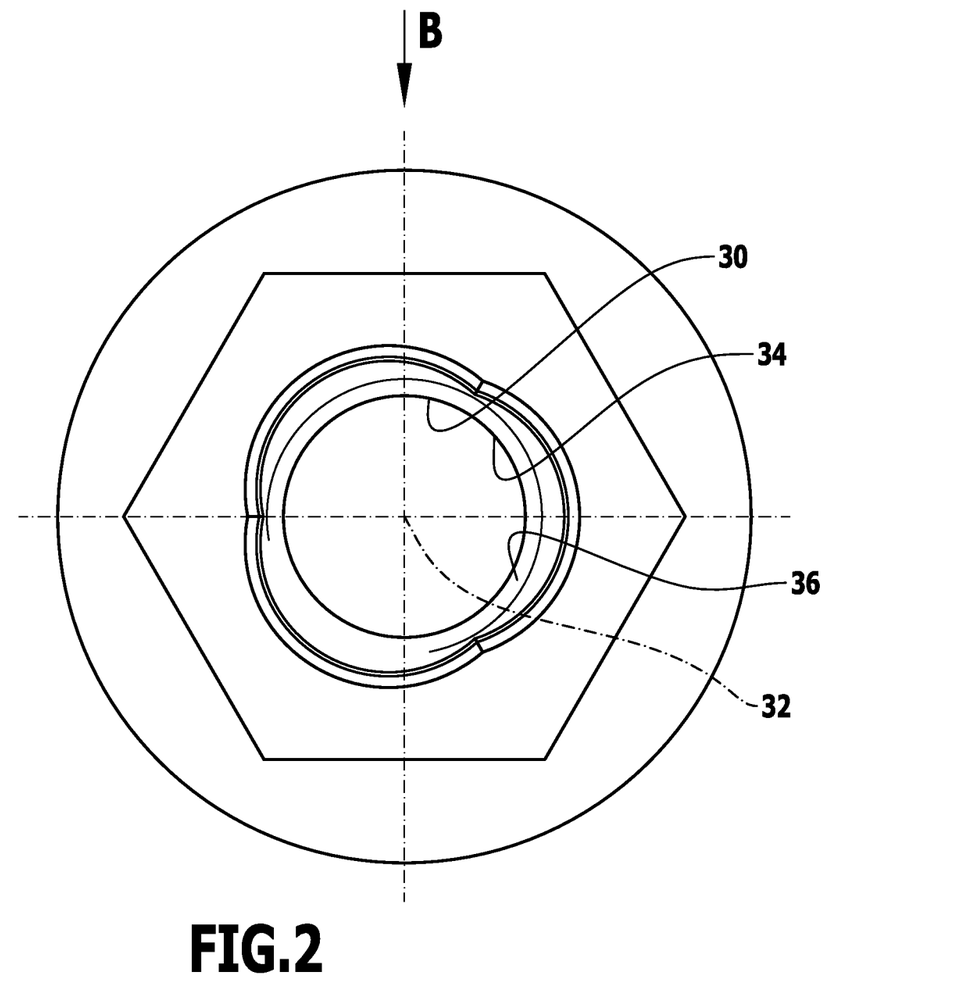
FIG. 2 shows a plan view of the securing nut according to the invention in the direction of arrow A in FIG. 1.
Figure 3:
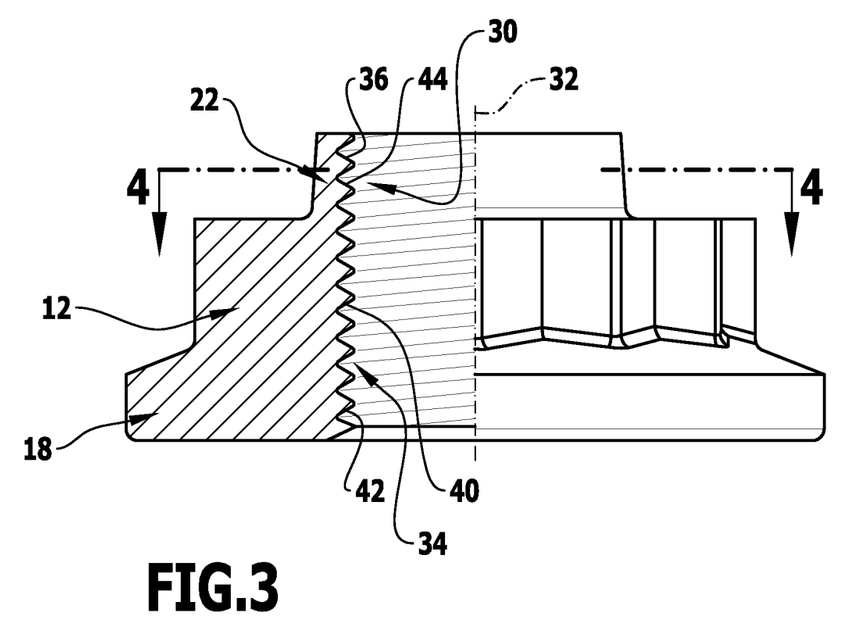
FIG. 3 shows a side view in the direction of arrow B in FIG. 2, cut away in one half.

As illustrated in FIGS. 1 to 3, a threaded bolt receptacle which is designated as a whole as 30 passes through the pressure flange 18, the base member 12 as well as the clamping element 22, extends coaxially to a central axis 32 and is provided with an internal thread 34, the thread pitches 36 of which not only run in an internal threaded section 40 of the threaded pin receptacle 30 on the base member but also run in an internal threaded section 42 on the pressure flange which penetrates the pressure flange 18 as well as in an internal threaded section 44 on the clamping element which penetrates the clamping element 22.

Figure 4:
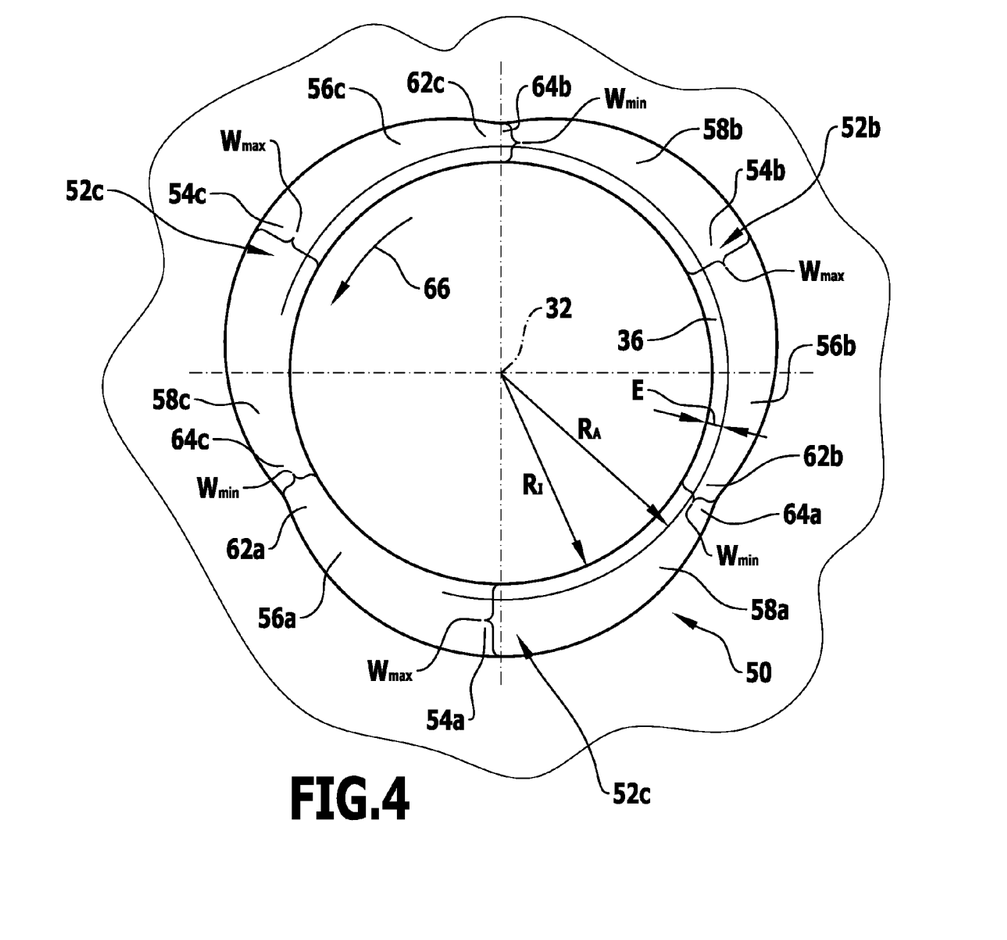
FIG. 4 shows a sectional view along line 4-4 in FIG. 3.

As illustrated in FIGS. 1, 2 and 4, the clamping element 22 is formed by a collar 50 which is integrally formed on the base member 12 in one piece, rises above its side 20 and has, for example, three collar sections 52a, 52b and 52c, each of which has a clamping area 54a, 54b, 54c, side areas 56a, 58a, 56b, 58b, 56c, 58c adjoining the respective clamping areas 54a, 54b, 54c on both sides and end areas 62, 64, wherein each of the collar sections 52 merges into the other collar section 52 in one piece following the respective end areas 62a, 64a, 62b, 64b, 62c, 64c.

For example, the collar section 52a merges with its end area 64a into the end area 62b of the collar section 52b and the collar section 52b merges with its end area 64b into the end area 62c of the collar section 52c which, for its part, again merges with the end area 64c into the end area 62a of the collar section 52a.

As a result, the collar sections 52a, 52b and 52c form, altogether, the collar 50 which extends in a closed manner around the internal threaded section 44 of the threaded bolt receptacle 30 on the clamping element in a circumferential direction 66 with respect to the central axis 32.

Furthermore, the collar sections 52 each vary with respect to their wall thickness radially to the central axis 32, namely such that in the clamping area 54 the maximum wall thickness $W_{max}$ is present whereas in the end areas 62, 64 the minimum wall thickness $W_{min}$ is present and so, altogether, the collar sections 52 merge into one another in one piece with their end areas 62, 64 at the minimum wall thickness $W_{min}$.

The minimum wall thickness $W_{min}$ is preferably selected such that this corresponds at the most to double a penetration depth E of the respective thread pitch 36 into the wall of the end areas 62, 64 accommodating it.

In this respect, the wall thickness $W_{min}$ is preferably selected such that a wall area which is not penetrated by the thread pitch 36 and has a thickness between 0.2 mm and 1 mm, preferably between 0.4 mm and 0.6 mm, remains in the respective end areas 62, 64 outside an outer radius $R_A$ of the thread pitches 36.

In contrast thereto, the wall thickness $W_{max}$ in the clamping areas 54 is at least double the penetration depth E of the thread pitches 36; the wall thickness $W_{max}$ is preferably between double and three times the penetration depth E of the thread pitches 36 into the respective wall.

In the embodiment illustrated, the collar sections 52 are designed—as illustrated, in particular, in FIG. 2 and FIG. 4—such that their cross-sectional shape is, altogether, like a sickle, wherein the wall thickness is continuously reduced from the maximum wall thickness $W_{max}$ in the respective clamping area as far as the respective end areas 62, 64.

The collar sections 52 preferably merge continuously into one another at their end areas 62, 64 with respect to their wall thickness W.

One exemplary embodiment provides for the entirety of all three collar sections 52a, 52b, 52c to have an outer contour similar to a trilocular outer contour.

Figure 5:
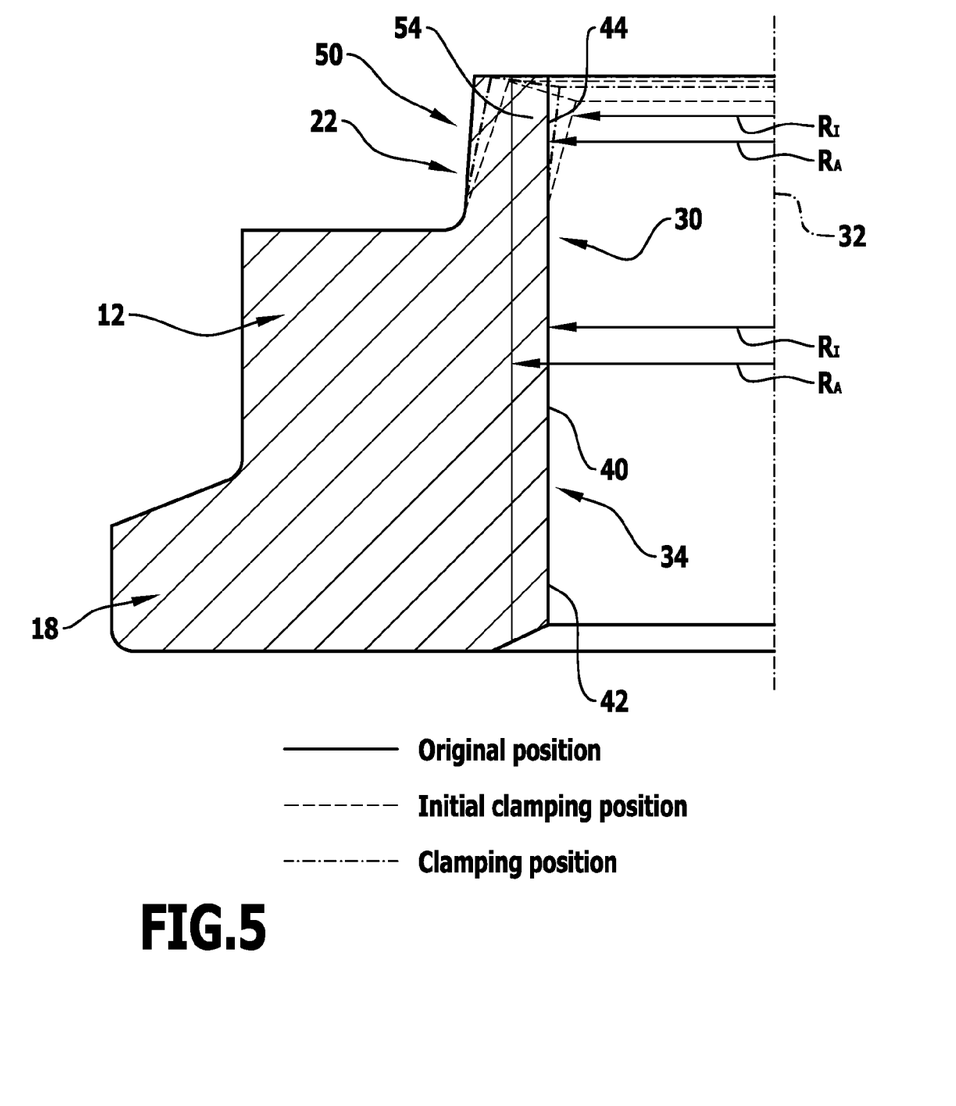
FIG. 5 shows a side view similar to FIG. 4, cut away in one half, in an enlarged illustration showing an original position, an initial clamping position and a clamping position of clamping areas of the collar.
Figure 6:
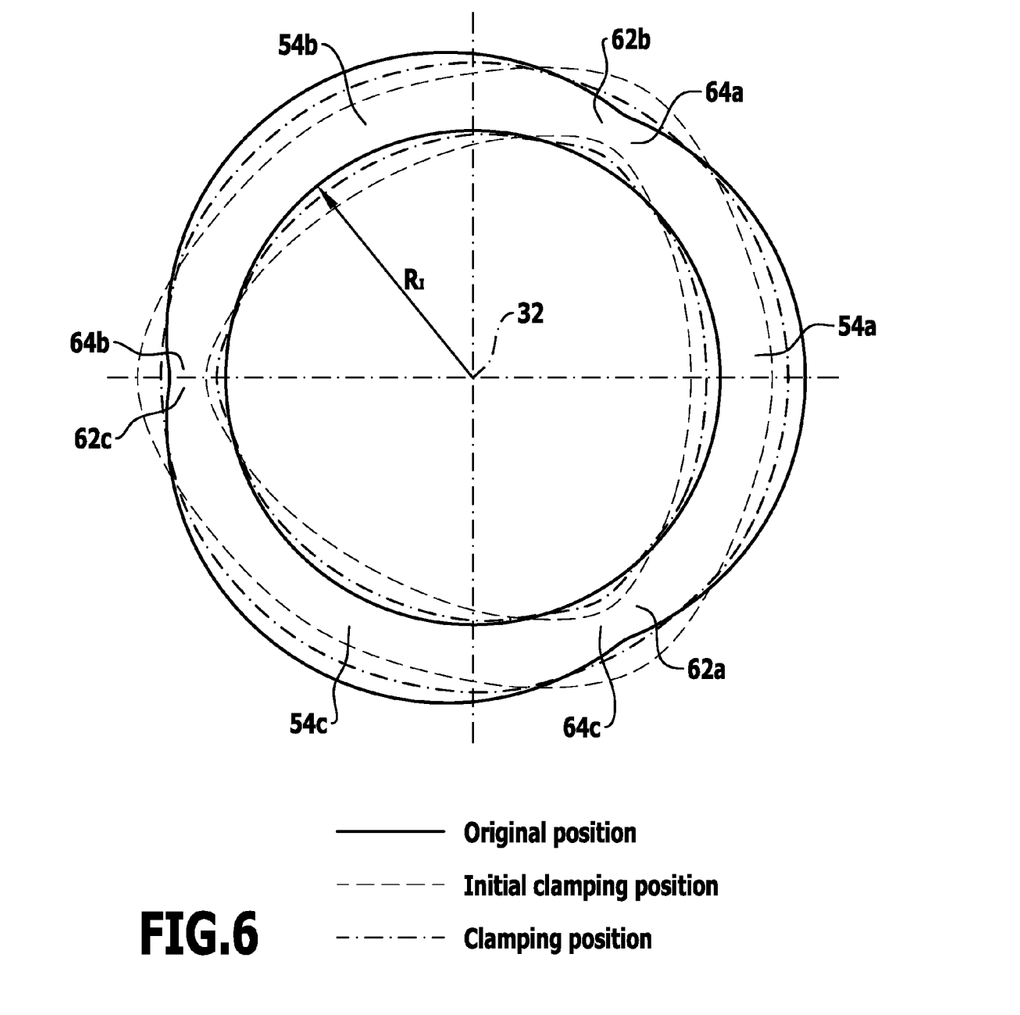
FIG. 6 shows an illustration similar to FIG. 4 showing the original position, the initial clamping position and the clamping position of the collar

In order to generate the clamping action of the clamping areas 54a according to the invention, the collar 50 is, as illustrated in FIG. 5, produced first of all in an original position, in which the internal thread 34 passes through the entire threaded bolt receptacle 30 with a constant inner and outer radius, i.e., not only the internal threaded section 40 on the base member but also the internal threaded section 42 on the pressure flange and the internal threaded section 44 on the clamping element (FIGS. 5, 6).

As a result, the internal thread 34 also extends with its thread pitches 36, in particular, in the internal threaded section 44 on the clamping element, which is comprised by the collar 50, in the same way as in the internal threaded section 40 on the base member.

Subsequently, as illustrated in FIGS. 5 and 6, a deformation of the collar sections 52 takes place in the clamping areas 54 of these collar sections to the extent that they are deformed in a direction relative to the central axis 32 by way of plastic deformation into an initial clamping position so that the inner radius $R_I$ and the outer radius $R_A$ of the internal thread 34 vary, namely in such a manner that the inner radius $R_I$ and the outer radius $R_A$ of the internal threaded section 44 on the clamping element are smaller in the clamping areas 54 than the inner radius $R_I$ and the outer radius $R_A$ of the internal threaded section 40 on the base member and are greater in the end areas 62 and 64 than those of the internal threaded section 40 on the base member. In the initial clamping position, the outer contour of the entirety of the collar sections 52 approximates a trilocular outer contour to an even greater extent.

In the initial clamping position, the internal threaded section 44 on the clamping element preferably extends in the clamping areas 54 conically to the central axis, i.e., an inner radius $R_I$ thereof is increasingly reduced in size in the clamping areas 54 with increasing distance from the base member 12 and, consequently, a side of the clamping areas 54 located remote from the base member 12 has the smallest possible inner radius $R_I$ from the central axis 32.

When a threaded bolt 70 is screwed into the threaded bolt receptacle 30 (FIG. 7), a clamping action is achieved in the clamping areas 54 of the collar sections 52 with an external thread 72 of the threaded bolt 70, wherein in order to achieve the clamping action proceeding from the initial clamping position, a deformation of the clamping areas 54 takes place with an increase in the inner radius $R_I$ and the outer radius $R_A$ into a clamping position, wherein this is an essentially elastic deformation of the clamping areas 54 which therefore causes a permanent elastic force of the internal threaded section 44 on the clamping element acting on the external thread 72 of the threaded bolt 70 and, therefore, generates the clamping action as a result of increased friction.

Figure 7:
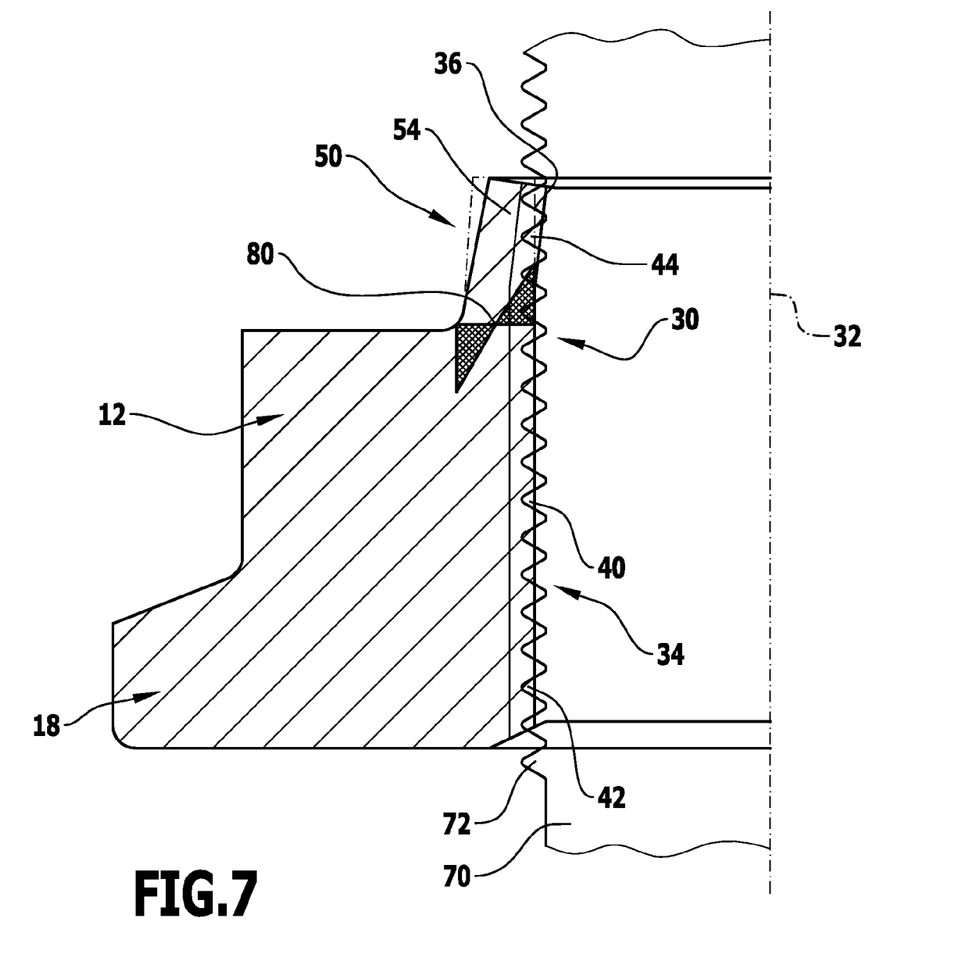
FIG. 7 shows an illustration similar to FIG. 5 with a threaded bolt screwed in in the clamping position of the collar.

The elastic deformation of the clamping areas 54 does, however, take place only to such an extent that an inner radius $R_I$ of the internal threaded section 44 on the clamping element is still smaller in the clamping areas 54 than the inner radius $R_I$ in the internal threaded section 40 on the base member and, therefore, the clearance normally existing with a thread is no longer present.

As a result, a clamping action is present in the clamping areas 54 of the collar sections 52 in a reproducible and permanent manner.

In addition, during the transition from the original position into the initial clamping position, the plastic deformation of the clamping areas 54 has the effect that the end areas 62, 64 of the collar sections 52 move radially outwards with respect to the central axis 32 and, therefore, the inner radius $R_I$ and the outer radius $R_A$ of the internal threaded section 44 on the clamping element are always larger in the end areas 62, 64 than in the internal threaded section 40 on the base member and so, altogether, an increase in the clearance in the end areas 62 and 64 occurs in the case of the threaded bolt 70 screwed into the threaded bolt receptacle 30 and, therefore, damage to the threaded bolt 70 by the end areas 62, 64 can be avoided with certainty in the end areas 62, 64 without, in particular, the formation of chippings.

This will also be achieved, in particular, in that the collar sections 52 merge into one another in the end areas 62, 64 and, therefore, support one another so that, on account of the geometrical ratios, the plastic deformation of the clamping areas 54 radially inwards automatically results in a plastic deformation of the end areas 62, 64 radially outwards in order to bring about the desired increase in the inner radius $R_I$ and the outer radius $R_A$ of the internal threaded section 44 in the end areas 62, 64 which are subsequently reduced again when the threaded bolt 70 is screwed into the threaded bolt receptacle 30.

The course of stresses in a base area 80 of the clamping areas 54 is likewise illustrated in FIG. 7, wherein it can be seen that compression stresses occur in the base area 80 located radially outwards whereas tensile stresses occur in the base area 80 located radially inwards and, together, they act on the clamping area 54 with an elastic force in the direction of the central axis 32 in order to achieve the clamping action with the external thread 72 of the screw bolt 70.

The invention claimed is:

1. Securing nut comprising a base member provided around its circumference with a key face contour, a threaded bolt receptacle provided with an internal thread defining a thread pitch and passing through the base member in the direction of a central axis as well as at least one clamping element provided on the base member, the clamping element being a collar arranged on one side of the base member, the internal thread continuing in said collar, and wherein the collar extends around the threaded bolt receptacle in a closed manner in circumferential direction with respect to the central axis, wherein a step is defined along an outer periphery of the securing nut including a radially extending surface defined by the base member and an axially extending surface defined by the collar, the radially extending surface and the axially extending surface joined at a corner, wherein the radially extending surface is a continuous annular surface that spaces the collar from flats on the key face contour, and wherein at the corner of the collar and the base member a non-circular interface is formed, and wherein the collar has a varying wall thickness including a minimum wall thickness Wmin that is at the most double a penetration depth E of the thread pitch and a maximum wall thickness Wmax that is at least double the penetration depth of the thread pitch wherein the collar defines an external outermost surface and an internal surface on opposing sides of the collar, the internal surface providing for said internal thread continuing in said collar, and wherein at the minimum wall thickness Wmin, the collar defines a largest outer radius from the central axis along the external outermost surface and a largest inner radius $R_I$ from the central axis along the internal surface.

2. Securing nut as defined in claim 1, wherein the collar forms a solid annular ring, and wherein the continuous annular surface is flat.

3. Securing nut as defined in claim 1, wherein the collar is integrally formed on the base member in one piece.

4. Securing nut as defined in claim 1, wherein the collar is arranged on a side of the base member located opposite a pressure flange.

5. Securing nut of claim 1, wherein the thread maintains a constant inner diameter in the base member and wherein the thread has a deformed inner diameter that is at least partially smaller than the constant inner diameter, the deformed inner diameter limited only to the collar.

6. Securing nut of claim 1, wherein the varying wall thickness is continuously varying as a collar of the wall extends radially from the minimum wall thickness Wmin to the maximum wall thickness Wmax and again to the minimum wall thickness Wmin.

7. Securing nut of claim 1, wherein Wmin is between 4 mm and 0.6 mm.

8. Securing nut comprising a base member provided around its circumference with a key face contour and having a first side being a pressure side and a second side opposite said pressure side, a threaded bolt receptacle provided with an internal thread and passing through the base member in the direction of a central axis as well as at least one clamping element provided on the base member, the at least one clamping element comprising a collar having at least two collar sections providing a plurality of clamping areas, the clamping areas having a greater wall thickness in a radial direction relative to the central axis than in a plurality of end areas of the collar sections located on both sides of the clamping areas, wherein the base member defines an end surface along the second side, the end surface extending radially inward to the collar, the collar projecting axially above the end surface, and wherein at a corner of the collar and the base member a non-circular interface is formed with the clamping areas being convexly rounded at the non-circular interface, wherein the at least two collar sections are adjacent and merge into each other and define common outer radii.

9. Securing nut as defined in claim 8, wherein the collar sections have a continuously decreasing wall thickness in the direction of said plurality of end areas proceeding from the clamping areas.

10. Securing nut as defined in claim 8, wherein the wall thickness of the collar sections is at a minimum in the end areas.

11. Securing nut as defined in claim 10, wherein the wall thickness in the end areas is less than half the maximum wall thickness in the clamping areas.

12. Securing nut as defined in claim 8, wherein each collar section adjoins at least one adjacent collar section in circumferential direction through an end area.

13. Securing nut as defined in claim 12, wherein the end area defines a minimum wall thickness.

14. Securing nut as defined in claim 12, wherein the collar sections merge into one another in one piece with their end areas.

15. Securing nut of claim 8, wherein the thread maintains a constant inner diameter in the base member and wherein the thread has a deformed inner diameter that is at least partially smaller than the constant inner diameter, the deformed inner diameter limited only to the collar.

16. Securing nut comprising a base member provided around its circumference with a key face contour, a threaded bolt receptacle provided with an internal thread and passing through the base member in the direction of a central axis as well as at least one clamping element provided on the base member, the at least one clamping element comprising a collar having three collar sections providing a plurality of clamping areas, the clamping areas having a greater wall thickness in a radial direction relative to the central axis than in side areas adjoining the clamping areas, wherein a step is defined along an outer periphery of the securing nut including a radially extending surface defined by the base member and an axially extending surface defined by the collar, the radially extending surface and the axially extending surface joined at a corner and wherein at the corner of the collar and the base member a non-circular interface is formed, the radially extending surface being an annular surface that spaces the collar from flats on the key face contour, the three collar sections merging into each other at end areas and forming a trilocular outer contour, wherein at least two of the three collar sections are adjacent and merge into each other and define common outer radii.

17. Securing nut as defined in claim 16, wherein the collar sections have a continuously decreasing wall thickness in the direction of the side areas proceeding from the clamping areas.

18. Securing nut as defined in claim 16, wherein the wall thickness in end areas adjoining the side areas is less than in the side areas.

19. Securing nut as defined in claim 16, wherein the wall thickness of the collar sections is at a maximum in the clamping areas.

20. Securing nut of claim 16, wherein the thread maintains a constant inner diameter in the base member and wherein the thread has a deformed inner diameter that is at least partially smaller than the constant inner diameter, the deformed inner diameter limited only to the collar.

\* \* \* \* \*

UNITED STATES PATENT AND TRADEMARK OFFICE
CERTIFICATE OF CORRECTION

PATENT NO. : 9,115,745 B2
APPLICATION NO. : 12/652135
DATED : August 25, 2015
INVENTOR(S) : Guenther Messmer et al.

Page 1 of 1

It is certified that error appears in the above-identified patent and that said Letters Patent is hereby corrected as shown below:

Column 8, line 6 reads:

"7. Securing nut of claim 1, wherein Wmin is between 4 mm and 0.6 mm."

Should read:

"7. Securing nut of claim 1, wherein Wmin is between .4 mm and 0.6 mm."

Signed and Sealed this
Ninth Day of February, 2016

Michelle K. Lee
*Director of the United States Patent and Trademark Office*